US012200646B2

(12) United States Patent
Sengupta et al.

(10) Patent No.: US 12,200,646 B2
(45) Date of Patent: Jan. 14, 2025

(54) SCHEDULING TIME OFFSET FOR NON-TERRESTRIAL NETWORKS

(71) Applicant: QUALCOMM Incorporated, San Diego, CA (US)

(72) Inventors: Ayan Sengupta, San Diego, CA (US); Alberto Rico Alvarino, San Diego, CA (US); Liangping Ma, San Diego, CA (US); Xiao Feng Wang, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 17/336,107

(22) Filed: Jun. 1, 2021

(65) Prior Publication Data

US 2021/0392602 A1  Dec. 16, 2021

Related U.S. Application Data

(60) Provisional application No. 63/038,704, filed on Jun. 12, 2020.

(51) Int. Cl.
*H04W 56/00* (2009.01)
*H04L 5/00* (2006.01)

(52) U.S. Cl.
CPC ......... *H04W 56/0045* (2013.01); *H04L 5/001* (2013.01); *H04W 56/0005* (2013.01)

(58) Field of Classification Search
None
See application file for complete search history.

(56) References Cited

U.S. PATENT DOCUMENTS

| 11,558,841 B2 * | 1/2023 | Zhang ............... H04W 56/0045 |
| 2017/0202028 A1 * | 7/2017 | Gaal ................... H04B 1/7143 |

(Continued)

FOREIGN PATENT DOCUMENTS

WO   WO-2019157979 A1 *  8/2019  ............ H04L 5/001

OTHER PUBLICATIONS

CATT: "PRACH Design and UL Timing Management", 3GPP TSG RAN WG1 Meeting #99, 3GPP Draft, R1-1912165, 3rd Generation Partnership Project (3GPP), Reno, USA, Nov. 18, 2019-Nov. 22, 2019, 5 Pages, Retrieved from the Internet: URL: https://ftp.3gpp.org/tsg_ran/WG1_RL1/TSGR1_99/Docs/R1-1912165.zip R1-1912165.docx [retrieved on Nov. 9, 2019].

(Continued)

*Primary Examiner* — Kibrom T Hailu
*Assistant Examiner* — Berhanu D Belete
(74) *Attorney, Agent, or Firm* — Seyfarth Shaw LLP

(57) ABSTRACT

A method by a user equipment (UE) includes receiving at least one time offset for scheduling non-terrestrial communications. The at least one first time offset is configured according to a numerology and/or a bandwidth part (BWP). The UE communicates in accordance with the time offset(s). The time offset may be a single time offset that applies across all numerologies or may be multiple time offsets, each specific to a particular numerology or bandwidth part (BWP). The time offset may be a single time offset scaled based on a current numerology configured for communications. The time offset may apply across different bandwidth parts (BWPs) or across multiple component carriers from which the UE is receiving downlink data.

27 Claims, 5 Drawing Sheets

(56) References Cited

U.S. PATENT DOCUMENTS

| | | | |
|---|---|---|---|
| 2018/0014268 A1* | 1/2018 | Kuppusamy | H04L 27/266 |
| 2018/0160440 A1* | 6/2018 | Hosseini | H04L 5/0078 |
| 2018/0295009 A1* | 10/2018 | Lindoff | H04W 56/001 |
| 2019/0090261 A1* | 3/2019 | Yang | H04W 72/0446 |
| 2019/0313412 A1* | 10/2019 | Baldemair | H04L 5/0039 |
| 2019/0386771 A1* | 12/2019 | Liu | H04B 7/0456 |
| 2020/0015274 A1* | 1/2020 | Islam | H04L 5/0053 |
| 2020/0107299 A1* | 4/2020 | Zhou | H04W 72/23 |
| 2020/0229244 A1* | 7/2020 | Yan | H04W 74/002 |
| 2020/0245317 A1* | 7/2020 | Hwang | H04W 68/02 |
| 2020/0314747 A1* | 10/2020 | Zhou | H04W 76/15 |
| 2020/0413414 A1* | 12/2020 | Wu | H04W 72/53 |
| 2020/0413451 A1* | 12/2020 | Taherzadeh Boroujeni | H04W 56/005 |
| 2021/0014895 A1* | 1/2021 | Wu | H04L 1/0067 |
| 2021/0029658 A1* | 1/2021 | Mahalingam | H04W 74/0833 |
| 2021/0045079 A1* | 2/2021 | Jiang | H04W 56/001 |
| 2021/0075501 A1* | 3/2021 | Xu | H04B 7/1853 |
| 2021/0167930 A1* | 6/2021 | Jeon | H04L 27/2607 |
| 2021/0227481 A1* | 7/2021 | Xu | H04W 74/0833 |
| 2021/0243762 A1* | 8/2021 | Selvanesan | H04L 5/0062 |
| 2021/0251012 A1* | 8/2021 | Shrestha | H04W 56/0005 |
| 2021/0352606 A1* | 11/2021 | Hosseinian | H04B 7/1853 |
| 2022/0007455 A1* | 1/2022 | Hong | H04W 76/28 |
| 2022/0173878 A1* | 6/2022 | Nory | H04L 5/001 |
| 2022/0279437 A1* | 9/2022 | Wigard | H04W 48/18 |
| 2022/0361237 A1* | 11/2022 | Hofström | H04L 5/0078 |

OTHER PUBLICATIONS

Ericsson: "Tuesday Offline Discussion on NTN Physical Layer Control Procedures", 3GPP TSG-RAN WG1 Meeting #98bis, 3GPP Draft, R1-1911487, 3rd Generation Partnership Project (3GPP), Chongqing, China, Oct. 14, 2019-Oct. 20, 2019, 12 Pages, Retrieved from the Internet: URL: https://ftp.3gpp.org/tsg_ran/WG1 RL1/TSGR1_98b/Docs/R1-1911487.zip R1-1911487 Tuesday offline discussion on NTN physical layer control procedures.docx [retrieved on Oct. 22, 2019].

International Search Report and Written Opinion—PCT/US2021/035539—ISA/EPO—Oct. 19, 2021.

Oppo: "NTN Control Procedure for Physical Layer", 3GPP TSG RAN WG1 #98bis, 3GPP Draft, R1-1910386, 3rd Generation Partnership Project (3GPP), Chongqing, China, Oct. 14, 2019-Oct. 20, 2019, 3 Pages, Retrieved from the Internet: URL: http://www.3gpp.org/ftp/tsg_ran/WG1_RL1/TSGR1_98b/Docs/R1-1910386.zip [retrieved on Oct. 5, 2019].

* cited by examiner

SCHEDULING TIME OFFSET FOR NON-TERRESTRIAL NETWORKS

CROSS-REFERENCE TO RELATED APPLICATION

The present application claims the benefit of U.S. Provisional Patent Application No. 63/038,704, filed on Jun. 12, 2020, and titled "SCHEDULING TIME OFFSET FOR NON-TERRESTRIAL NETWORKS," the disclosure of which is expressly incorporated by reference in its entirety.

FIELD OF THE DISCLOSURE

Aspects of the present disclosure generally relate to wireless communications, and more particularly to techniques and apparatuses for 5G new radio (NR) scheduling time offsets for non-terrestrial networks.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to aspects of the present disclosure, a method of wireless communication by a user equipment (UE) includes receiving at least one first time offset for scheduling non-terrestrial communications. The at least one first time offset is configured according to at least one of a numerology or a bandwidth part (BWP). The method also includes communicating in accordance with the at least one first time offset.

In other aspects, an apparatus for wireless communication at a sidelink user equipment (UE) includes a processor and a memory coupled to the processor. Instructions stored in the memory, when executed by the processor cause the apparatus to receive at least one first time offset for scheduling non-terrestrial communications. The at least one first time offset is configured according to at least one of a numerology or a bandwidth part (BWP). The instructions also cause the apparatus to communicate in accordance with the at least one first time offset.

According to aspects of the present disclosure, a user equipment (UE) for wireless communication includes means for receiving at least one first time offset for scheduling non-terrestrial communications. The at least one first time offset is configured according to at least one of a numerology or a bandwidth part (BWP). The UE also includes means for communicating in accordance with the at least one first time offset.

In yet other aspects, a non-transitory computer-readable medium records program code. The program code is executed by a user equipment (UE) and comprises program code to receive at least one first time offset for scheduling non-terrestrial communications. The at least one first time offset is configured according to at least one of a numerology or a bandwidth part (BWP). The program code also includes program code to communicate in accordance with the at least one first time offset.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
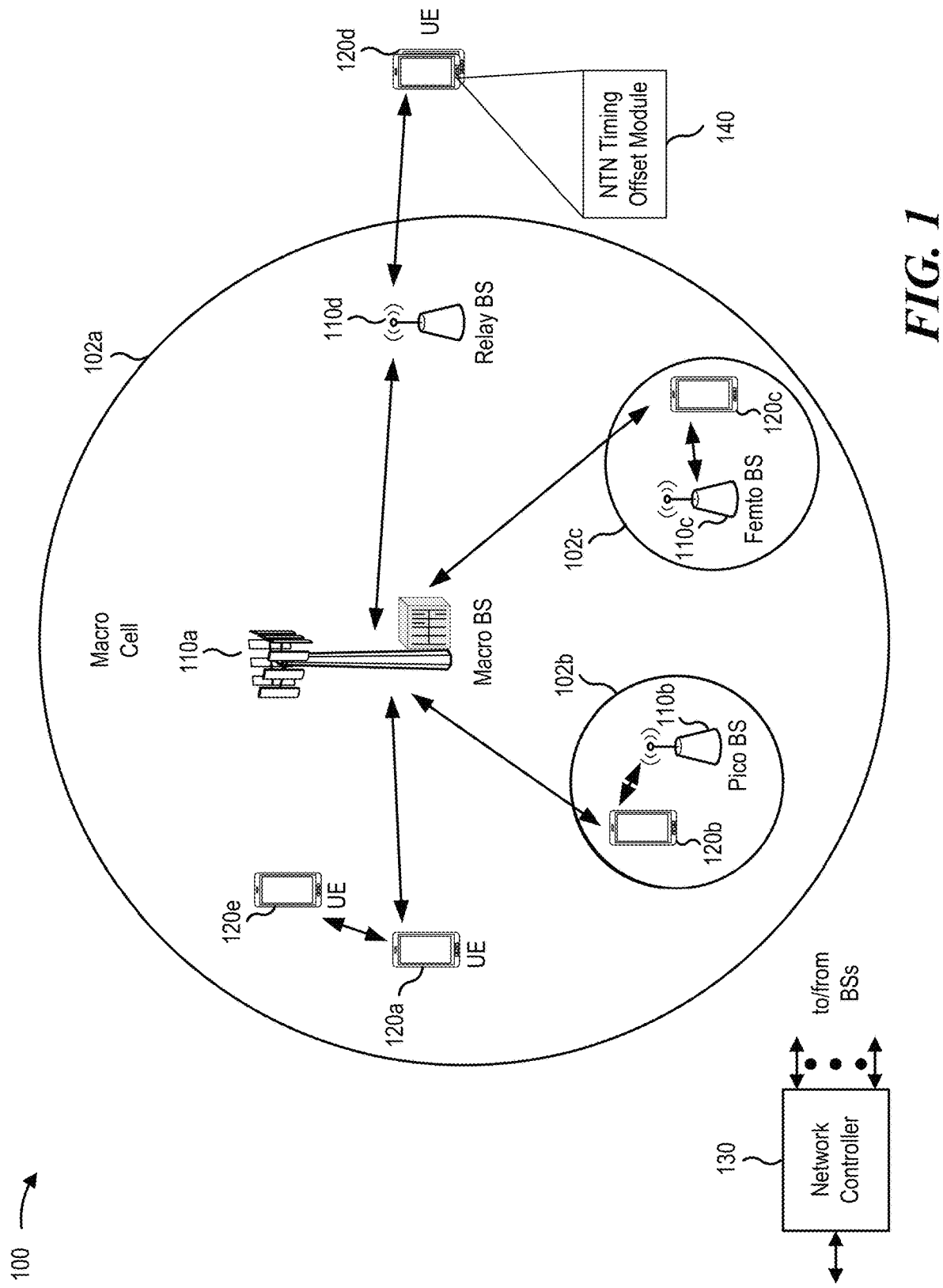
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In non-terrestrial networks (NTNs), a round-trip time from a base station to a UE, via an intermediate satellite, may be rather large. Similarly, a round-trip time between a base station on a satellite and the UE may be large. The large round-trip times are due to the large distances the electromagnetic waves traverse. The 5G-new radio system compensates for this round-trip time delay with additional time offsets to ensure valid scheduling of transmissions with uplink-downlink (UL-DL) interactions.

According to aspects of the present disclosure, the additional time offsets may be signaled and determined across different numerologies in potentially different bandwidth parts (BWPs), component carriers, etc. In some aspects of the present disclosure, a numerology agnostic timing offset value ($K_{offset}$) is provided. That is, the timing offset value designates a same number of slots for every numerology. Numerology refers to at least a subcarrier spacing, for example, 15 kHz, 30 kHz, etc.

In other aspects, the network signals a default timing offset value for a baseline numerology. The timing offset value for any specific numerology is then determined by applying scaling factors to that of the baseline numerology. According to other aspects of the present disclosure, the network signals different timing offset values to be applied to different numerologies or different bandwidth parts (BWPs). According to still further aspects of the present disclosure, the different timing offset options described above apply across different bandwidth parts or across different component carriers (CCs) in a carrier aggregation configuration.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB,", "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a non-terrestrial network (NTN) timing offset module 140. For brevity, only one UE 120d is shown as including the NTN timing offset module 140. The NTN timing offset module 140 may receive one or more first time offset(s) for scheduling non-terrestrial communications. The one or more first time offset(s) is configured according to at least one of a numerology or a bandwidth part (BWP). The NTN timing offset module 140 may also communicate in accordance with the one or more first time offset(s).

As indicated above, FIG. 1 is provided merely as an example. Other examples may differ from what is described with regard to FIG. 1.

Figure 2:
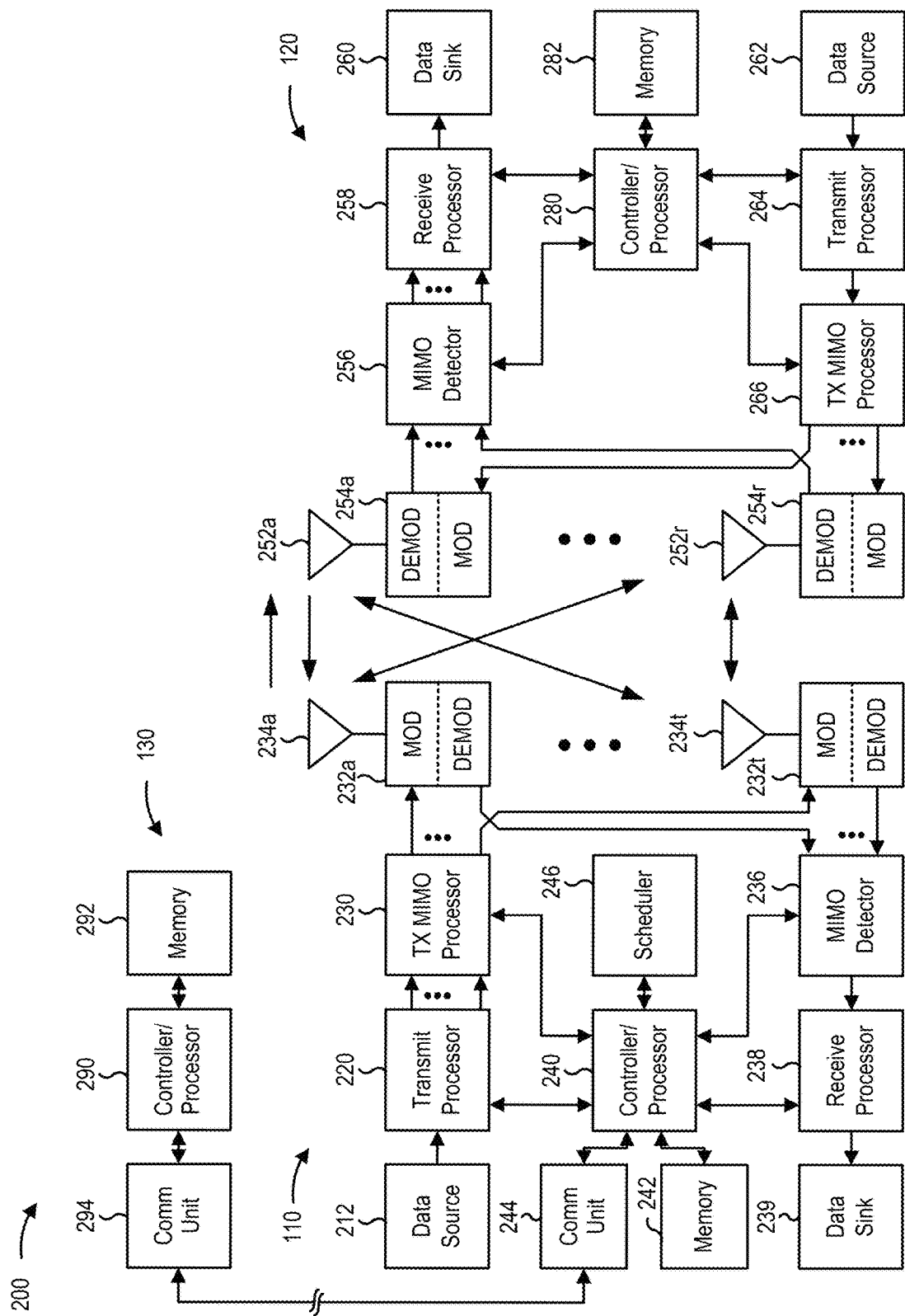
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with non-terrestrial network time offsets, as described in more detail elsewhere. For example, the controller/processor 240 of the base station 110, the controller/processor 280 of the UE 120, and/or any other component(s) of FIG. 2 may perform or direct operations of, for example, the processes of FIG. 5 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for communicating, means for scaling, means for deriving, and/or means for determining. Such means may include one or more components of the UE 120 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
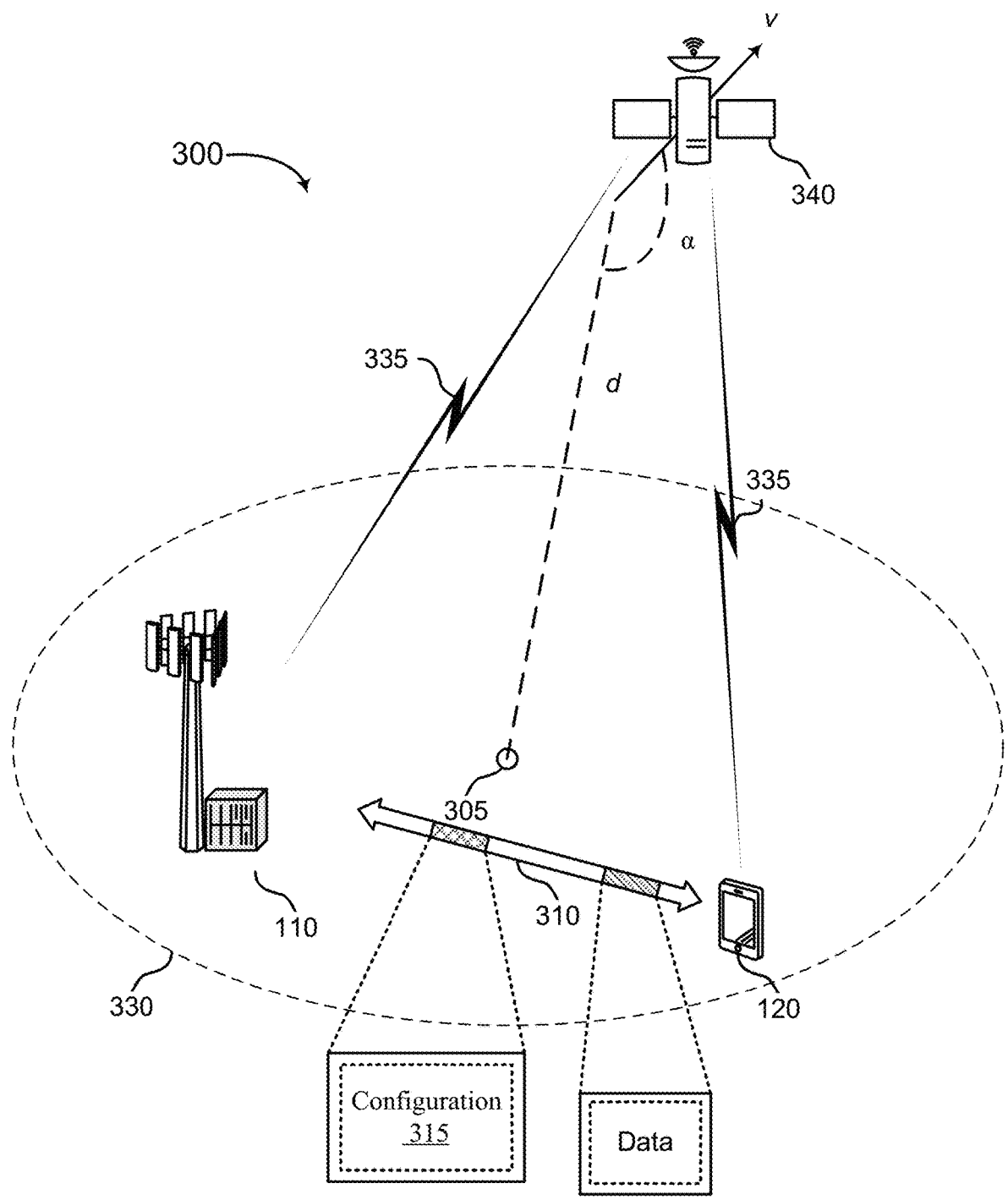
FIG. 3 illustrates an example of a wireless communications system that supports scheduling timing offsets for non-terrestrial networks in accordance with aspects of the present disclosure.

FIG. 3 illustrates an example of a wireless communications system 300 that supports scheduling timing offsets for non-terrestrial networks (NTNs) in accordance with aspects of the present disclosure. In some examples, the wireless communications system 300 may implement aspects of the wireless communications system 100. The wireless communications system 300 may include a base station 110 and a UE 120, which may be examples of the corresponding devices described with reference to FIG. 1. For example, the wireless communications system 300 may be a non-terrestrial network, which may include a base station 110, a UE 120, and a satellite 340. The satellite 340 may relay communications for base stations (for example, base station 110) and mobile terminals (for example, UE 120). The base station 110 may also be referred to as a gateway. The geographical area associated with a transmission beam of the satellite 340 may be called a beam footprint 330 and the UE 120 may communicate with the satellite 340 when the UE 120 is located within the beam footprint 330.

The base station 110 may perform a communication procedure (for example, a radio resource control (RRC) procedure, such as a cell acquisition procedure, random access procedure, RRC connection procedure, RRC configuration procedure) with the UE 120. The base station 110 may be configured with multiple antennas, which may be used for directional or beamformed transmissions. As part of the communication procedure, the base station 110 may establish a bi-directional communication link 310 for communication with the UE 120. Additionally, or alternatively, as part of the communication procedure, the base station 110 may configure the UE 120 with a configuration 315 (for example, time and frequency resources, a reference signal periodicity, an indication of a symbol of a slot for transmitting reference signals) via RRC signaling. Although shown communicating directly in FIG. 3, the present disclosure focuses on communications of the UE 120 to the base station 110 via the satellite 340.

The satellite 340 may generate satellite information (for example, ephemeris information) associated with communications between the satellite 340, the UE 120, and the base station 110. For example, the satellite 340 may determine a propagation delay associated with transmissions between the satellite 340, the UE 120, and the base station 110. In some cases, the propagation delay may be based on the distance d from the satellite 340 to the point 305 (for example, center) of the beam footprint 330. In other cases, the propagation delay may be a factor of the distance d, which may correspond to the round-trip distance between the base station 110 and the satellite 340. Additionally, or alternatively, the propagation delay may be an estimated round-trip delay or a round-trip time between the UE 120 and the base station 110, which may be based at least in part on the distance d and/or 2d. It should be noted that the distance d may not reflect the precise distance from the satellite 340 to the UE 120. For example, the UE 120 may be located at an edge of the beam footprint 330 and may be a different distance from the satellite 340 than the distance d. However, such a difference in distance may be insignificant compared to the distance d. Thus, the distance d may be a sufficient representation of the distance from the satellite 340 to the UE 120.

The satellite 340 may transmit, via wireless communication links 335, the satellite information to the base station 110 and/or the UE 120, which may be located within the beam footprint 330. In some cases, the satellite 340 may update and transmit the satellite information to the base station 110 and/or the UE 120 at a preconfigured schedule (for example, an update rate). The preconfigured schedule may be based on a velocity of the satellite 340. For example, the velocity of the satellite 340 may result in a maximum round-trip time variation rate of 50 μs per second. That is, for every second of movement of the satellite 340, the round-trip time of communications between the satellite 340 and the UE 120, for example, may vary by 50 μs. The round-trip time variation rate may also vary based on the movement of the satellite (for example, orbit). In such instances, the satellite 340 may update the satellite information multiple times every second. Additionally, or alternatively, the base station 110 may transmit the satellite information to the UE 120 via the bi-directional communication link 310, for example, as part of the configuration 315. In some cases, the base station 110 may transmit the satellite information to the UE 120 based on the preconfigured schedule, for example, the update rate of the satellite 340.

The satellite information may also include the velocity of the satellite 340. The velocity of the satellite 340 may, in some cases, be defined by or relate to the following expression v×cos(α), where α is the angle between the vector of velocity v and the vector of distanced. The UE 120 may use the velocity of the satellite 340 to determine the round-trip time variation rate. In some cases, the UE 120 may determine the round-trip time variation rate using the velocity of the satellite 340 based at least in part on the UE 120 being located relative to the point 305 of the beam footprint 330. In some examples, using the velocity of the satellite 340, the round-trip time variation rate may be defined by the following expression −2v×cos(α)/c, where α is the angle between the vector of velocity v and the vector of distance d, and c is the speed of light. As such, if an upstream transmission is scheduled to be transmitted at time $t_0$ with a timing adjustment $t_a$, the actual transmission time by the UE 120 may be $t_0+t_a$. For a subsequent upstream transmission scheduled to be transmitted at time $t_a+\Delta t$ without a new timing adjustment provided by the base station 110, the actual transmission time by the UE 120 may be $t_a+\Delta t \times (-2v \times \cos(\alpha)/c)$.

When the UE 120 is in the discontinuous reception (DRX) mode and in RRC-idle or RRC-connected, the base station 110 may transmit downlink control information in certain time and frequency resources (for example, fixed symbols). Between these time and frequency resources, the UE 120 may enter a lower-power state, also referred to as "sleep mode," so as to reduce power consumption and increase battery life for the UE 120. In RRC-idle or RRC-connected, the UE 120 may wake up once every number of symbols to receive a downstream transmission from the base station 110 and/or the satellite 340. The gap periods allocated prior to and following a reference signal transmission may benefit the base station 110 by reducing or eliminating interference between the UE 120 transmission and a transmission from another neighboring UE.

Figure 4:
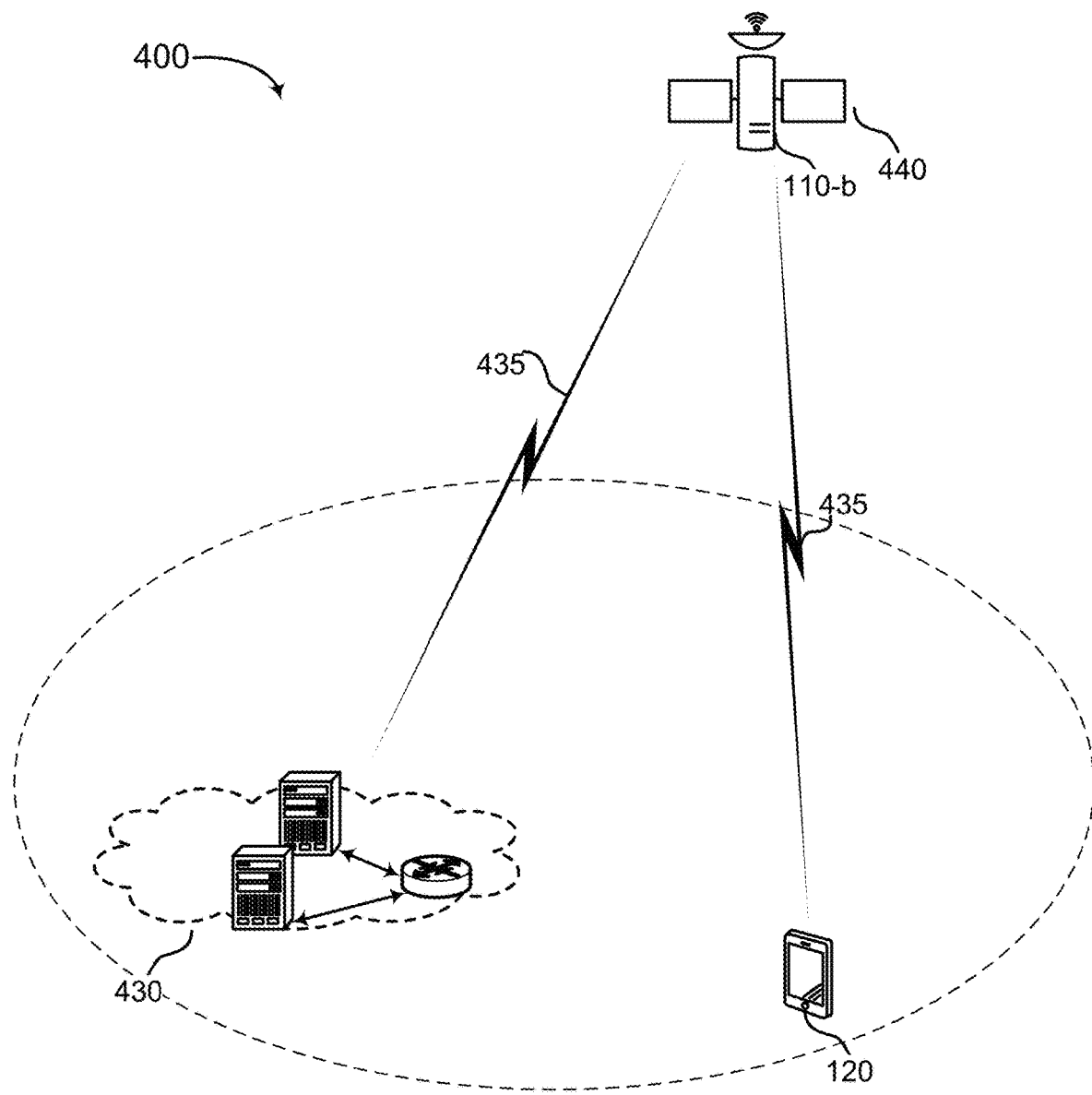
FIG. 4 illustrates an example of another wireless communications system that supports scheduling timing offsets for non-terrestrial networks in accordance with aspects of the present disclosure.

FIG. 4 shows an alternate network configuration of a wireless communications system 400, according to aspects of the present disclosure. In this configuration, the base station 110-b is located on the satellite 440. The base station 110-b communicates with a core network 430 via wireless communication links 435. The UE 120 communicates with the non-terrestrial base station 110-b via wireless communications links 435.

In non-terrestrial networks (NTNs), the round-trip time from the base station 110 to the UE 120, via an intermediate satellite 340, may be rather large. Similarly, the round-trip time between the base station 110-b on the satellite 440 and the UE 120 may be large. The large round-trip times are due to the large distances the electromagnetic waves traverse.

The 5G-new radio system compensates for this round-trip time delay with additional time offsets to ensure valid scheduling of transmissions with uplink-downlink (UL-DL) interactions. These additional offsets (referred to as $K_{offset}$ in clause 6.2.1.2 of 3GPP (Third Generation Partnership Project) technical report 38.821) may be applied to the timing relationships that involve uplink-downlink interaction. The UE may derive $K_{offset}$ from broadcast system information when acquiring a satellite cell or $K_{offset}$ may be configured by higher layers, such as with radio resource control (RRC) signaling. The $K_{offset}$ value may be per satellite beam or per cell. According to aspects of the present disclosure, the $K_{offset}$ value may be signaled and determined across different numerologies in potentially different bandwidth parts (BWPs), component carriers, etc.

In the 3GPP technical report 38.821, the $K_{offset}$ value applies to the transmission timing of a DCI (downlink control information) scheduled physical uplink shared channel (PUSCH) (including CSI (channel state information) on the PUSCH), the transmission timing of a random access response (RAR) grant scheduled PUSCH, the transmission timing of hybrid automatic repeat request-acknowledgment (HARQ-ACK) messages on the physical uplink control channel (PUCCH), the media access control-control element (MAC-CE) action timing, the CSI reference resource timing, and the transmission timing of an aperiodic sounding reference signal (SRS). In the 3GPP technical report 38.821, the value of $K_{offset}$ is given as a number of slots with no dependency on any numerology (for example, the subcarrier spacing (SCS) configured for the communication). In practice, different numerologies may be employed in different component carriers.

Because the propagation delay does not depend on the numerology, using a numerology agnostic timing offset value may result in more delay than necessary for the numerologies with small SCS (e.g., large slot duration), degrading throughput. For numerologies with large SCS (e.g., small slot duration), invalid scheduling configurations may result because a number of slots may not be sufficient to address the propagation delay. Even between a 15 kHz and 60 kHz numerology, a numerology-agnostic timing offset value quadruples the absolute time apportioned for propagation delay in going from a 60 kHz numerology to a 15 kHz numerology.

According to aspects of the present disclosure, a numerology agnostic timing offset value ($K_{offset}$) is provided. That is, the timing offset value designates a same number of slots for every numerology. The network broadcasts or signals the timing offset value ($K_{offset}$) conservatively, in other words, such that numerologies with a largest possible subcarrier spacing can be scheduled. This timing offset value ($K_{offset}$) may reduce throughput for numerologies with smaller subcarrier spacings.

According to other aspects of the present disclosure, the network broadcasts or signals a default timing offset value for a baseline numerology. The UE then determines the timing offset value for any specific numerology by applying scaling factors. For example, the default timing offset value may be broadcast or signaled for a numerology $\mu^{default}$ as $K_{offset}^{default}$. The specific timing offset value ($K_{offset}$) for a numerology $\mu$ is determined as $$K_{offset} = f\left(K_{offset}^{default} \times \frac{2^{\mu}}{2^{\mu^{default}}}\right),$$

where $f(.)$ may represent a ceiling or floor operation in some cases. The function $f(.)$ may be defined in the specifications, or provided in broadcast or dedicated signaling. In some aspects, the function $f(.)$ may be an identity function.

According to still other aspects of the present disclosure, the network broadcasts or signals different timing offset values to be applied to different numerologies. This option potentially provides more granularity vis-à-vis scaling, at the cost of more signaling overhead. Thus, a first timing offset may be signaled for a first numerology and a second timing offset may be signaled for a second numerology. Similarly, more than two timing offsets may be signaled if more than two numerologies are present.

According to further aspects of the present disclosure, the network broadcasts or signals different timing offset values for different bandwidth parts (BWPs). In these aspects, a first timing offset may be signaled for a first BWP and a second timing offset may be scheduled for a second BWP. Similarly, more than two timing offsets may be signaled if more than two BWPs are present.

According to aspects of the present disclosure, the different timing offset options described above apply across different bandwidth parts. That is, the UE may assume the solutions to be applicable to different bandwidth parts that may be part of the same beam or cell, for example, based on common system information. In the case of a numerology agnostic time offset, the UE applies the time offset across all bandwidth parts having common system information, such as a common system information block (SIB) message. Similarly, for a scaled/default time offset or an offset specific to a specific numerology, the UE applies the time offset across all bandwidth parts sharing the system information.

Multiple component carriers (CCs) in a carrier aggregation configuration are contemplated by the present disclosure. Each component carrier has its own system information. If multiple component carriers are configured, different values for the time offset may be received for each component carrier due to the differing system information. That is, multiple sets of time offsets may be received. A UE may send an uplink transmission (for example, transmitting HARQ-ACK feedback), corresponding to downlink receptions over multiple component carriers, in a common uplink carrier, such as a primary component carrier in a time division duplexing (TDD) mode of operation. In this case, the timeline for the uplink transmission should be uniquely determined with respect to the common uplink carrier. Towards this unique determination of the timeline, a set of common values of time offsets may be determined from among the multiple sets of time offsets corresponding to the multiple downlink component carriers. An example in which the above event may occur is the case of cross-carrier scheduling, where a primary component carrier schedules downlink transmissions on multiple (primary and secondary) component carriers, with HARQ feedback provided jointly on the primary component carrier.

In aspects of the present disclosure, the UE may determine the common offset(s) for the timeline described above based on offsets corresponding to a primary component carrier. For example, the offsets may be communicated to the UE as broadcast system information, dedicated RRC signaling, etc. In other aspects, the UE may determine the common offset(s) as a maximum offset out of the assigned time offsets for the multiple component carriers. The determination may be per numerology or per single offset value, depending on how the offsets are signaled. Either of these aspects may operate with the time offsets described above, that is, the numerology agnostic time offset, the scaled time offset, the BWP specific time offset, and the numerology specific time offset.

As indicated above, FIGS. 3-4 are provided as examples. Other examples may differ from what is described with respect to FIGS. 3-4.

Figure 5:
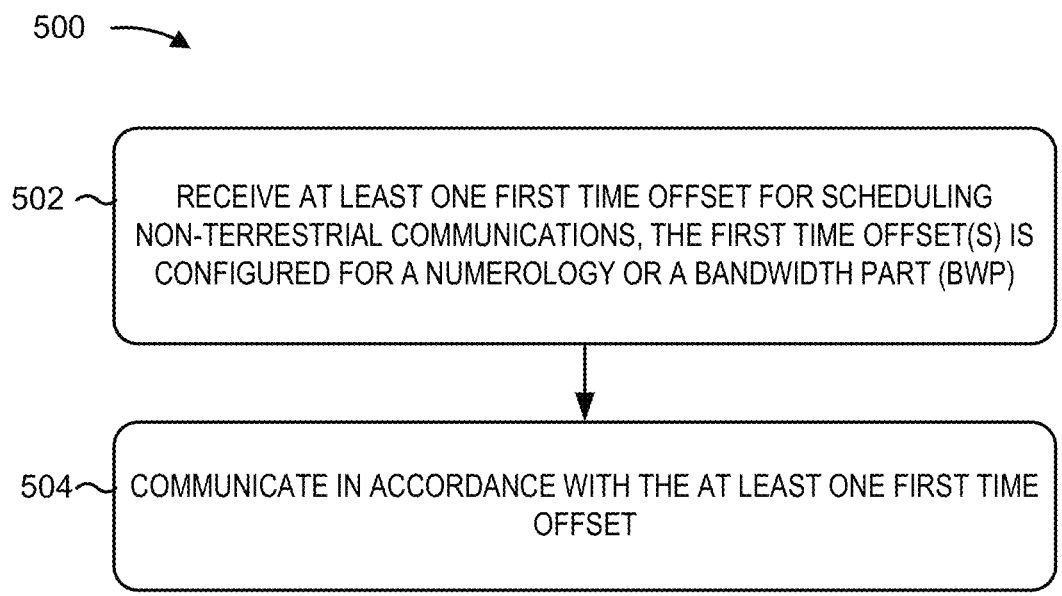
FIG. 5 is a diagram illustrating an example process performed, for example, by a user equipment (UE), communicating with scheduling time offsets in accordance with various aspects of the present disclosure.

FIG. 5 is a diagram illustrating an example process 500 performed, for example, by a UE, in accordance with various aspects of the present disclosure. The example process 500 is an example of scheduling time offsets for non-terrestrial networks. As shown in FIG. 5, in some aspects, the process 500 may include receiving at least one first time offset for scheduling non-terrestrial communications. The first time offset(s) is configured according to a numerology and/or a bandwidth part (BWP) (block 502). For example, the user equipment (for example, using the antenna 252*a*, DEMOD/MOD 254*a*, MIMO detector 256, receive processor 258, controller/processor 280, and/or memory 282) receives the first time offset(s). The first time offset(s) may be a single time offset that applies across all numerologies. In other aspects, the first time offset(s) is a single time offset, and the UE scales the single time offset based on a current numerology configured for communications, in order to derive a scaled time offset. The UE may derive the scaled time offset by applying a ceiling operation and/or a floor operation. The first time offset(s) may include a first offset specific to a first numerology and/or BWP, and a second offset specific to a second numerology and/or BWP. The first time offset(s) may include at least one time offset associated with each component carrier from which the UE is receiving downlink data.

The process 500 may include communicating in accordance with the at least one first time offset (block 504). For example, the user equipment (for example, using the antenna 252*r*, DEMOD/MOD 254*r*, MIMO detector 256, receive processor 258, TX MIMO processor 266, transmit processor 264, controller/processor 280, and/or memory 282) communicates in accordance with the at least one first time offset. In the case of a scaled offset, the UE may communicate in accordance with the scaled time offset instead of the single time offset. In other aspects, the UE may communicate in accordance with the first time offset(s) across different bandwidth parts (BWPs) corresponding to common system information. The UE may determine a timing for uplink transmission on an uplink component carrier based on the time offset(s) associated with a primary downlink component carrier or based on a maximum time offset across all aggregated downlink component carriers.

Implementation examples are described in the following numbered clauses.

1. A method of wireless communication by a user equipment (UE), comprising:
    receiving at least one first time offset for scheduling non-terrestrial communications, wherein the at least one first time offset is configured according to at least one of a numerology or a bandwidth part (BWP); and
    communicating in accordance with the at least one first time offset.
2. The method of clause 1, wherein the at least one first time offset is a single time offset that applies across all numerologies.
3. The method of clause 1 or 2, wherein the at least one first time offset comprises a single time offset, and the method further comprises:
    scaling the time offset based on a current numerology configured for communications, in order to derive a scaled time offset; and
    communicating in accordance with the at least one first time offset by applying the scaled time offset.
4. The method of any of the preceding clauses, further comprising deriving the scaled time offset by applying at least one of a ceiling operation or a floor operation.
5. The method of clause 1, wherein the at least one first time offset comprises a first time offset specific to a first numerology and a second time offset specific to a second numerology.
6. The method of any of preceding clauses 1 or 5, wherein the at least one first time offset comprises a first time offset specific to a first bandwidth part (BWP) and a second time offset specific to a second BWP.
7. The method of any of preceding clauses 1, 5, or 6, wherein communicating in accordance with the at least one first time offset comprises communicating in accordance with the at least one first time offset across a plurality of different bandwidth parts (BWPs) corresponding to common system information.
8. The method of any of preceding clauses 1, 5, 6, or 7, wherein the at least one first time offset comprises at least one time offset associated with each component carrier from which the UE is receiving downlink data.
9. The method of any of preceding clauses 1, 5, 6, 7, or 8, further comprising determining a timing for uplink transmission on an uplink component carrier based on the at least one time offset associated with a primary downlink component carrier.
10. The method of any of preceding clauses 1, 5, 6, 7, 8, or 9 further comprising determining a timing for uplink transmission on an uplink component carrier based on a maximum time offset across all aggregated downlink component carriers.
11. The method of any of preceding clauses 1, 5, 6, 7, 8, 9, or 10, wherein the maximum time offset comprises a maximum time offset for each numerology.
12. The method of any of preceding clauses 1, 5, 6, 7, 8, 9, 10, or 11 wherein the at least one first time offset associated with each component carrier comprises at least one of a scaled time offset, a numerology agnostic time offset, a bandwidth part specific time offset, or a numerology specific time offset.
13. An apparatus for wireless communications at a user equipment (UE), comprising:
    a processor,
    memory coupled with the processor; and
    instructions stored in the memory and operable, when executed by the processor, to cause the apparatus:
        to receive at least one first time offset for scheduling non-terrestrial communications, wherein the at least one first time offset is configured according to at least one of a numerology or a bandwidth part (BWP); and
        to communicate in accordance with the at least one first time offset.
14. The apparatus of clause 13, wherein the at least one first time offset is a single time offset that applies across all numerologies.
15. The apparatus of clause 13 or 14, wherein the at least one first time offset is a single time offset, and in which the processor causes the apparatus:
    to scale the single time offset based on a current numerology configured for communications, in order to derive a scaled time offset; and
    to communicate in accordance with the at least one first time offset by applying the scaled time offset.
16. The apparatus of any of the clauses 13-15, wherein the processor causes the apparatus to derive the scaled time offset by applying at least one of a ceiling operation or a floor operation.
17. The apparatus of clause 13, wherein the at least one first time offset comprises a first time offset specific to a first numerology and a second time offset specific to a second numerology.
18. The apparatus of any of clause 13 or 17, wherein the at least one first time offset comprises a first time offset specific to a first bandwidth part (BWP) and a second time offset specific to a second BWP.
19. The apparatus of any of clauses 13, 17 or 18, wherein the processor causes the apparatus to communicate in accordance with the at least one first time offset across a plurality of different bandwidth parts (BWPs) corresponding to common system information.
20. The apparatus of any of clauses 13 or 17-19, wherein the at least one first time offset comprises at least one time offset associated with each component carrier from which the UE is receiving downlink data.
21. The apparatus of any of clauses 13 or 17-20, wherein the processor causes the apparatus to determine a timing for uplink transmission on an uplink component carrier based on the at least one time offset associated with a primary downlink component carrier.
22. The apparatus of any of clauses 13 or 17-21, wherein the processor causes the apparatus to determine a timing for uplink transmission on an uplink component carrier based on a maximum time offset across all aggregated downlink component carriers.
23. The apparatus of any of clauses 13 or 17-22, wherein the maximum time offset comprises a maximum time offset for each numerology.
24. The apparatus of any of clauses 13 or 17-23, wherein the at least one first time offset associated with each component carrier comprises at least one of a scaled time offset, a numerology agnostic time offset, a bandwidth part specific time offset, or a numerology specific time offset.
25. A user equipment (UE) for wireless communications, comprising:
    means for receiving at least one first time offset for scheduling non-terrestrial communications, wherein the at least one first time offset is configured according to at least one of a numerology or a bandwidth part (BWP); and means for communicating in accordance with the at least one first time offset.

26. The UE of clause 25, wherein the at least one first time offset is a single time offset that applies across all numerologies.

27. The UE of clause 25 or 26, wherein the at least one first time offset is a single time offset, and the UE further comprises:

means for scaling the single time offset based on a current numerology configured for communications, in order to derive a scaled time offset; and means for communicating in accordance with the at least one first time offset by applying the scaled time offset.

28. The UE of clause 25, wherein the at least one first time offset comprises a first time offset specific to a first numerology and a second time offset specific to a second numerology.

29. The UE of any of clauses 25 or 28, wherein the at least one first time offset comprises a first time offset specific to a first bandwidth part (BWP) and a second time offset specific to a second BWP.

30. The UE of any of clauses 25, 28, or 29, wherein means for communicating in accordance with the at least one first time offset comprises means for communicating in accordance with the at least one first time offset across a plurality of different bandwidth parts (BWPs) corresponding to common system information.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication at a user equipment (UE), comprising:

receiving, via at least broadcast non-terrestrial network (NTN) system information, at-a single NTN time offset;

scaling the single NTN time offset according to at least one of a first numerology or a bandwidth part (BWP) to generate a single scaled numerology specific NTN time offset by applying at least one of a ceiling operation or a floor operation, the first numerology corresponding to a first subcarrier spacing (SCS); and communicating in a non-terrestrial network and in accordance with the single scaled numerology specific NTN time offset, the single scaled numerology specific NTN time offset differing from a second scaled numerology specific NTN time offset associated with a second UE configured with a second numerology different than the first numerology.

2. The method of claim 1, wherein the single NTN time offset applies across all numerologies including the first numerology.

3. The method of claim 1, wherein the single NTN time offset comprises a first time offset specific to the first numerology and the method further comprises receiving a second time offset specific to the second numerology.

4. The method of claim 1, wherein the single NTN time offset comprises a first time offset specific to a first bandwidth part (BWP) and the UE further receives a second time offset specific to a second BWP.

5. The method of claim 1, wherein communicating in accordance with the single scaled numerology specific NTN time offset comprises communicating in accordance with the single scaled numerology specific NTN time offset across a plurality of different bandwidth parts (BWPs) corresponding to common system information.

6. The method of claim 1, wherein the single NTN time offset further comprises at least one NTN time offset associated with each component carrier from which the UE is receiving downlink data.

7. The method of claim 6, further comprising transmitting an uplink transmission on an uplink component carrier based on the single scaled numerology specific NTN time offset, which is associated with a primary downlink component carrier.

8. The method of claim 6, further comprising transmitting an uplink transmission on an uplink component carrier based on a maximum time offset across all aggregated downlink component carriers.

9. The method of claim 6, wherein the single NTN time offset associated with each component carrier comprises at least one of a single scaled time offset, a numerology agnostic time offset, a bandwidth part specific time offset, or a numerology specific time offset.

10. The method of claim 8, wherein the maximum time offset comprises a maximum time offset for each numerology.

11. The method of claim 1, further comprising receiving dedicated radio resource control (RRC) signaling for the single NTN time offset.

12. An apparatus for wireless communications, comprising: at least one processor; and at least one memory comprising instructions executable by the at least one processor to cause the apparatus to: receive, via at least broadcast non-terrestrial network (NTN) system information, a single NTN time offset; scale the single NTN time offset according to at least one of a first numerology or a bandwidth part (BWP) to generate a single scaled numerology specific NTN time offset by applying at least one of a ceiling operation or a floor operation, the first numerology corresponding to a first subcarrier spacing (SCS); and communicate in a non-terrestrial network and in accordance with the single scaled numerology specific NTN time offset, the single scaled numerology specific NTN time offset differing from a second scaled numerology specific NTN time offset associated with a second user equipment (UE) configured with a second numerology different than the first numerology.

13. The apparatus of claim 12, wherein the single NTN time offset applies across all numerologies including the first numerology.

14. The apparatus of claim 12, wherein the single NTN time offset comprises a first time offset specific to the first numerology and the at least one processor is further configured to receive a second time offset specific to the second numerology.

15. The apparatus of claim 12, wherein the single NTN time offset comprises a first time offset specific to a first bandwidth part (BWP) and the at least one processor is further configured to receive a second time offset specific to a second BWP.

16. The apparatus of claim 12, wherein the at least one processor is configured to cause the apparatus to communicate in accordance with the single scaled numerology specific NTN time offset across a plurality of different bandwidth parts (BWPs) corresponding to common system information.

17. The apparatus of claim 12, wherein the single NTN time offset further comprises at least one NTN time offset associated with each component carrier from which the apparatus is receiving downlink data.

18. The apparatus of claim 17, further comprising a transceiver configured to transmit an uplink transmission on an uplink component carrier based on the single-NTN time offset, which is associated with a primary downlink component carrier, wherein the apparatus is configured as a user equipment (UE).

19. The apparatus of claim 17, further comprising a transceiver configured to transmit an uplink transmission on an uplink component carrier based on a maximum time offset across all aggregated downlink component carriers, wherein the apparatus is configured as a user equipment (UE).

20. The apparatus of claim 17, wherein the single-NTN time offset associated with each component carrier comprises at least one of a single scaled time offset, a numerology agnostic time offset, a bandwidth part specific time offset, or a numerology specific time offset.

21. The apparatus of claim 19, wherein the maximum time offset comprises a maximum time offset for each numerology.

22. The apparatus of claim 12, wherein the at least one processor is further configured to cause the apparatus to receive dedicated radio resource control (RRC) signaling for the single NTN time offset.

23. A user equipment (UE), comprising:
at least one transceiver; at least one processor; and at least one memory comprising instructions executable by the at least one processor to cause the apparatus to:
receive, via at least broadcast non-terrestrial network (NTN) system information, a single NTN time offset, said reception occurring via the transceiver; scale the single NTN time offset according to at least one of a first numerology or a bandwidth part (BWP) to generate a single scaled numerology specific NTN time offset by applying at least one of a ceiling operation or a floor operation, the first numerology corresponding to a first subcarrier spacing (SCS); and
communicate in a non-terrestrial network and in accordance with the single scaled numerology specific NTN time offset, the single scaled numerology specific NTN time offset differing from a second scaled numerology specific NTN time offset associated with a second UE configured with a second numerology different than the first numerology, said communicating occurring via the transceiver.

24. The UE of claim 23, wherein the single NTN time offset applies across all numerologies including the first numerology.

25. The UE of claim 23, wherein the at least one processor is further configured to cause the UE to receive dedicated radio resource control (RRC) signaling for the single NTN time offset.

26. The UE of claim 23, wherein the single at least one NTN time offset comprises a first time offset specific to the first numerology and the at least one processor is further configured to cause the UE to receive a second time offset specific to the second numerology.

27. The UE of claim 23, wherein the single at least one NTN time offset comprises a first time offset specific to a first bandwidth part (BWP) and the at least one processor is further configured to cause the UE to receive a second time offset specific to a second BWP.

* * * * *